(12) United States Patent
Xie et al.

(10) Patent No.: US 7,246,990 B2
(45) Date of Patent: Jul. 24, 2007

(54) COMPOSITE FAN CONTAINMENT CASE FOR TURBINE ENGINES

(75) Inventors: Ming Xie, Beavercreek, OH (US); Stephen C. Mitchell, West Chester, OH (US); Donald George LaChapelle, Cincinnati, OH (US); Lee A. Blanton, Cincinnati, OH (US); Richard T. Price, Yorba Linda, CA (US); David W. Crall, Loveland, OH (US); Frank Worthoff, West Chester, OH (US)

(73) Assignee: General Electric Company, Schenectady, NY (US)

( * ) Notice: Subject to any disclaimer, the term of this patent is extended or adjusted under 35 U.S.C. 154(b) by 182 days.

(21) Appl. No.: 11/020,483

(22) Filed: Dec. 23, 2004

(65) Prior Publication Data

US 2007/0081887 A1    Apr. 12, 2007

(51) Int. Cl.
*F01D 22/00*    (2006.01)
(52) U.S. Cl. ............... 415/9; 415/173.4; 60/39.091
(58) Field of Classification Search .............. 415/9, 415/170.1, 173.4, 174.4; 60/223, 39.091
See application file for complete search history.

(56) References Cited

U.S. PATENT DOCUMENTS

| | | | |
|---|---|---|---|
| 4,411,589 A | 10/1983 | Joubert et al. | |
| 4,818,176 A | 4/1989 | Huether et al. | |
| 5,344,280 A * | 9/1994 | Langenbrunner et al. | 415/9 |
| 5,431,532 A | 7/1995 | Humke et al. | |
| 5,437,538 A * | 8/1995 | Mitchell | 415/9 |
| 5,447,411 A * | 9/1995 | Curley et al. | 415/9 |
| 6,428,280 B1 | 8/2002 | Austin et al. | |
| 6,435,824 B1 | 8/2002 | Schell et al. | |
| 6,561,760 B2 | 5/2003 | Wadia et al. | |

OTHER PUBLICATIONS

Search Report; Place of Search - The Hague; Dated Nov. 8, 2006; Reference 157187/11183; Application No./Patent No. 05257854.9 -1267; 8 pgs.

* cited by examiner

*Primary Examiner*—Edward K. Look
*Assistant Examiner*—Dwayne J White
(74) *Attorney, Agent, or Firm*—William Scott Andes; Armstrong Teasdale LLP

(57) ABSTRACT

A composite fan casing for a gas turbine engine is provided includes, in an exemplary embodiment, a core having a plurality of core layers of reinforcing fiber bonded together with a thermosetting polymeric resin. Each core layer includes a plurality of braided reinforcing fibers with the braids of reinforcing fibers aligned in a circumferential direction.

15 Claims, 6 Drawing Sheets

COMPOSITE FAN CONTAINMENT CASE FOR TURBINE ENGINES

BACKGROUND OF THE INVENTION

This invention relates generally to gas turbine engines, and more particularly, to methods and apparatus for operating gas turbine engines.

Gas turbine engines typically include high and low pressure compressors, a combustor, and at least one turbine. The compressors compress air which is mixed with fuel and channeled to the combustor. The mixture is then ignited for generating hot combustion gases, and the combustion gases are channeled to the turbine which extracts energy from the combustion gases for powering the compressor, as well as producing useful work to propel an aircraft in flight or to power a load, such as an electrical generator.

When engines operate in various conditions, foreign objects may be ingested into the engine. More specifically, various types of foreign objects may be entrained in the inlet of a gas turbine engine, ranging from large birds, such as sea gulls, to hailstones, sand and rain. The foreign objects may impact a blade resulting in a portion of the impacted blade being torn loose from a rotor. Such a condition, known as foreign object damage, may cause the rotor blade to pierce an engine casing resulting in cracks along an exterior surface of the engine casing, and possible injury to nearby personnel. Additionally, the foreign object damage may cause a portion of the engine to bulge or deflect resulting in increased stresses along the entire engine casing.

To facilitate preventing the increased engine stresses and the possible injury to personnel, at least some known engines include a metallic casing shell to facilitate increasing a radial and an axial stiffness of the engine, and to facilitate reducing stresses near the engine casing penetration. However, casing shells are typically fabricated from a metallic material which results in an increased weight of the engine and therefore the airframe.

BRIEF DESCRIPTION OF THE INVENTION

In one aspect, a composite fan casing for a gas turbine engine is provided. The casing includes a core having a plurality of core layers of reinforcing fiber bonded together with a thermosetting polymeric resin. Each core layer includes a plurality of braided reinforcing fibers with the braids of reinforcing fibers aligned in a circumferential direction.

In another aspect, a method of fabricating a composite fan casing for a gas turbine engine is provided. The method includes forming a core having a plurality of core layers of reinforcing fiber bonded together with a thermosetting polymeric resin. Each core layer includes a plurality of braided reinforcing fibers formed from tows of fibers. The braids of reinforcing fibers are aligned in a circumferential direction.

In another aspect, a method of fabricating a composite fan casing for a gas turbine engine is provided. The method includes forming a core having a plurality of core layers of reinforcing fiber bonded together with a thermosetting polymeric resin. Each core layer includes a plurality of braided reinforcing fibers formed from tows of fibers. The braids of reinforcing fibers are aligned in a circumferential direction. The method also includes bonding at least one build-up layer to at least one of an inner surface of the core and an outer surface of the core.

DETAILED DESCRIPTION OF THE INVENTION

A composite fan casing for a gas turbine engine is described below in detail. The casing includes a core having a plurality of core layers of reinforcing fiber bonded together with a thermosetting polymeric resin. Each core layer includes a plurality of braided reinforcing fibers with the braids of reinforcing fibers aligned in a circumferential direction. The composite casing resists crack propagation under impact loading. During impact, kinetic energy is dissipated by delamination of braided layers which then capture and contain the impact objects.

Figure 1:
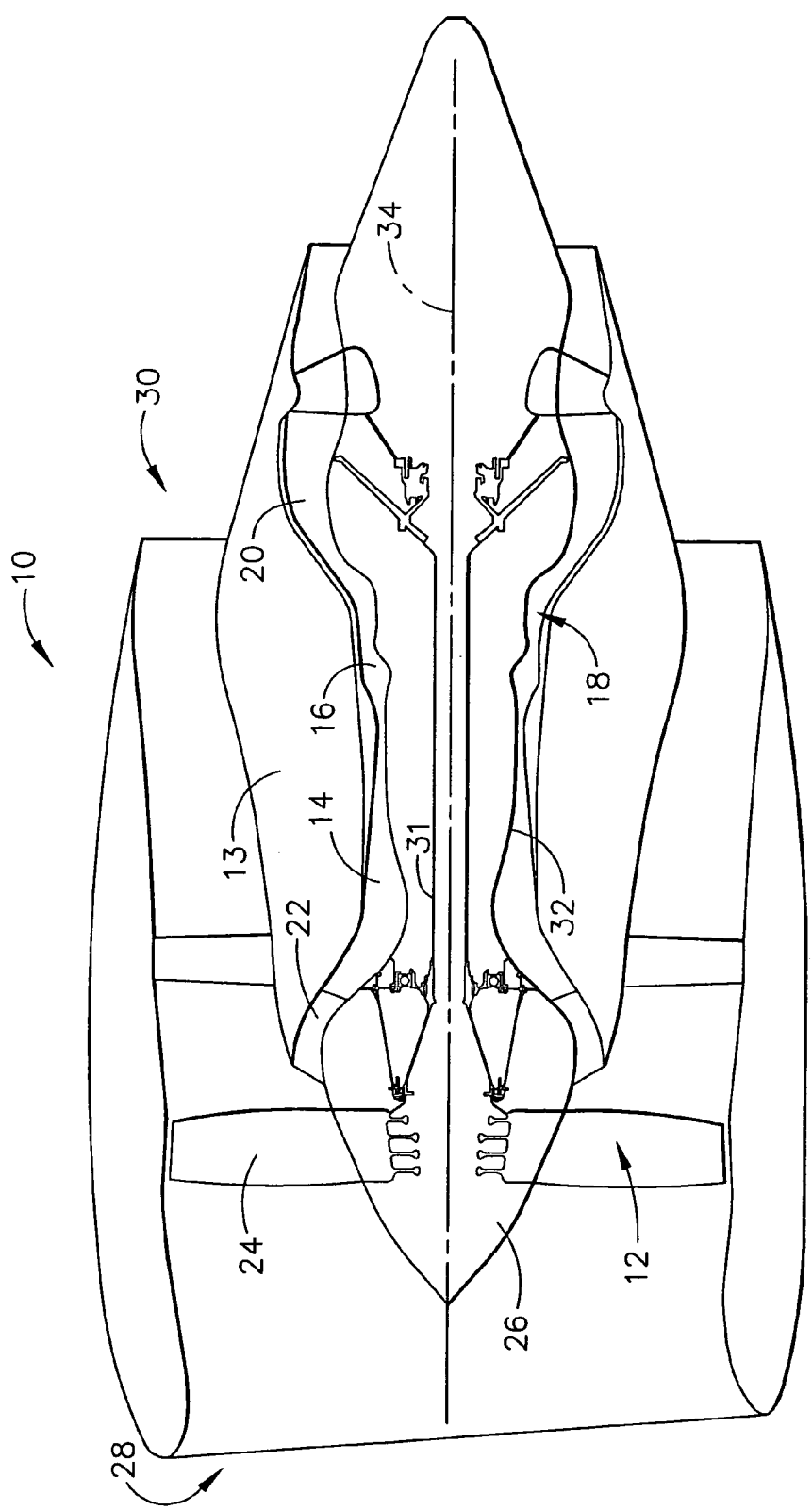
FIG. 1 is schematic illustration of a gas turbine engine.

Referring to the drawings, FIG. 1 is a schematic illustration of a gas turbine engine 10 that includes a fan assembly 12 and a core engine 13 including a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30. In one embodiment, the gas turbine engine is a GE90 available from General Electric Company, Cincinnati, Ohio. Fan assembly 12 and turbine 20 are coupled by a first rotor shaft 31, and compressor 14 and turbine 18 are coupled by a second rotor shaft 32.

During operation, air flows through fan assembly 12, along a central axis 34, and compressed air is supplied to high pressure compressor 14. The highly compressed air is delivered to combustor 16. Airflow (not shown in FIG. 1) from combustor 16 drives turbines 18 and 20, and turbine 20 drives fan assembly 12 by way of shaft 31.

Figure 2:
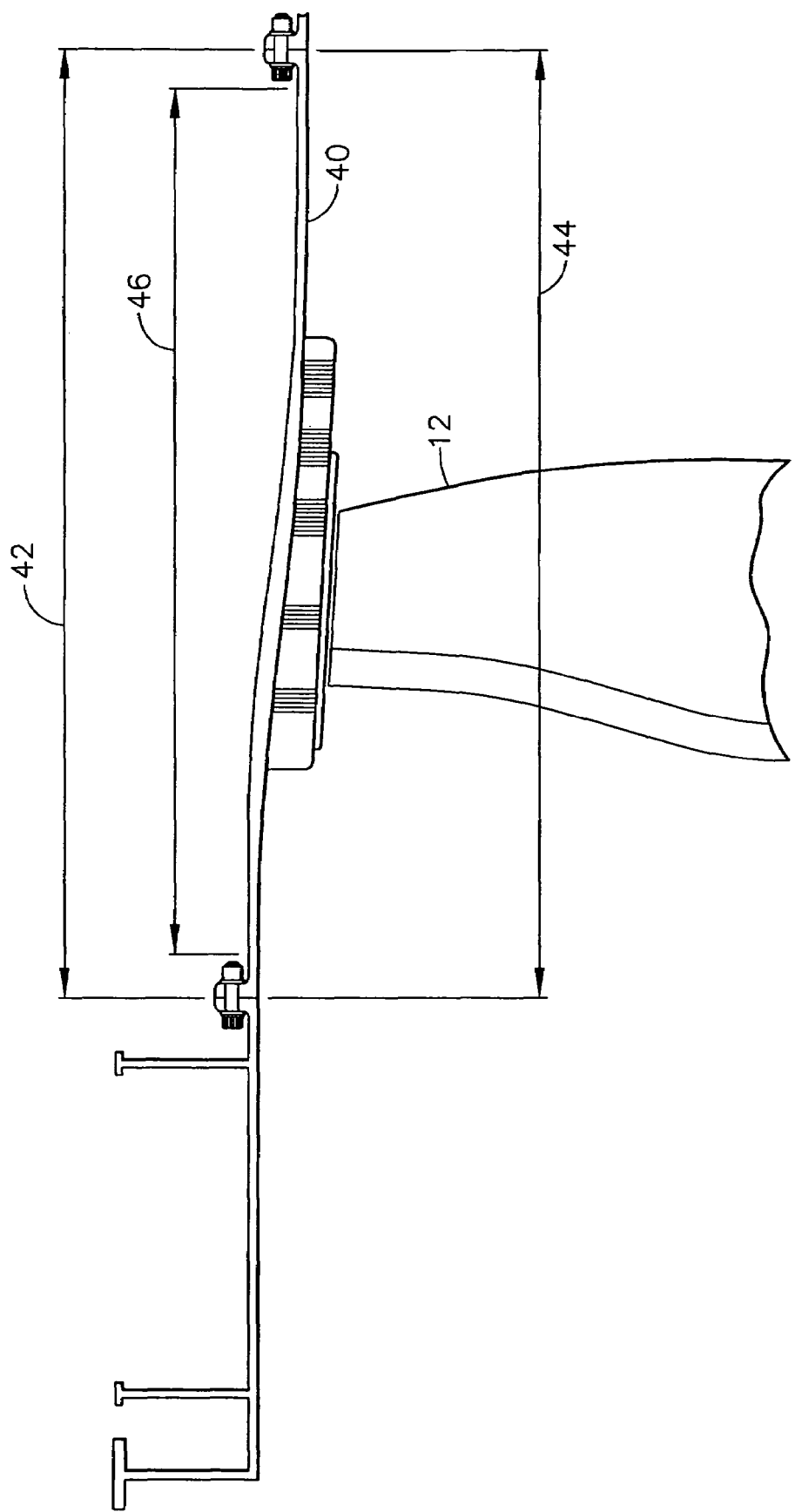
FIG. 2 is a schematic cross-section illustration of the fan containment case shown in FIG. 1.
Figure 3:
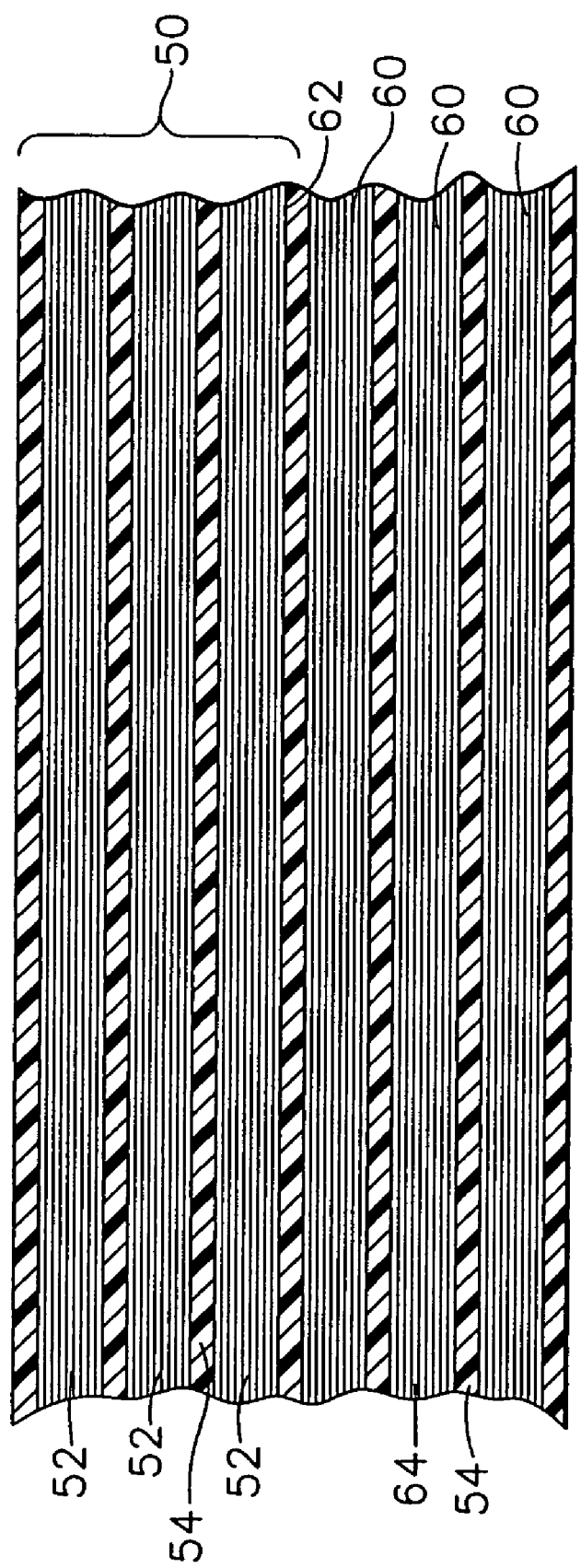
FIG. 3 is a schematic cross-section illustration of a portion of the fan containment case shown in FIG. 2 in accordance with an exemplary embodiment.

FIG. 2 is a schematic cross-section illustration of a fan containment casing 40, and FIG. 3 is a schematic cross-section illustration of a portion of fan containment case 40. Referring to FIGS. 2 and 3, in an exemplary embodiment, engine containment casing 40 is a hardwall containment system that includes a length 42 that is approximately equal to a fan assembly length 44. More specifically, length 42 is variably sized so that fan containment case 40 circumscribes a prime containment zone 46 of fan assembly 12. Prime containment zone as used herein is defined a zone extending both axially and circumferentially around fan assembly 12 where a fan blade is most likely to be ejected from fan assembly 12.

Figure 4:
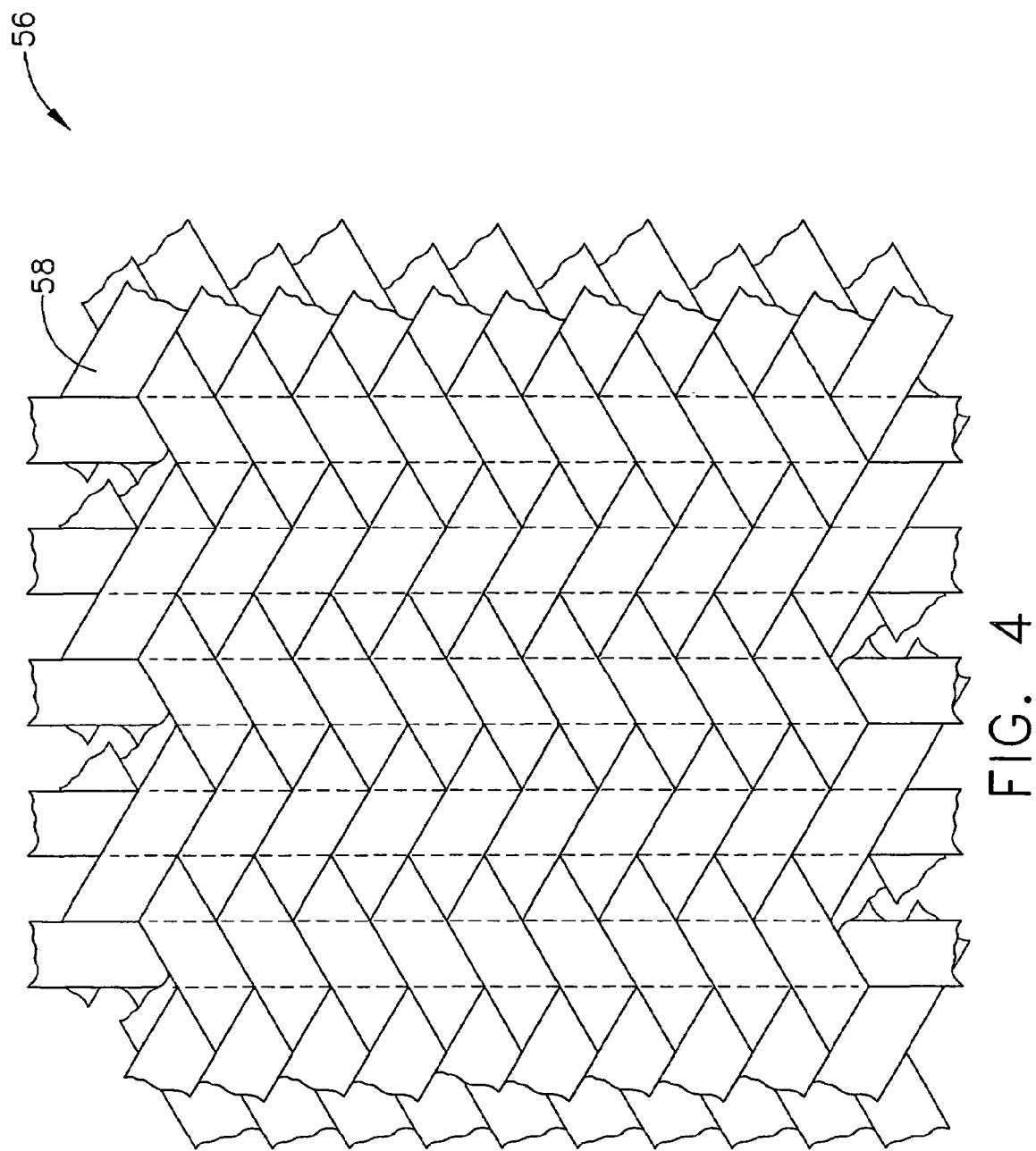
FIG. 4 is a schematic illustration of a braided mat of reinforcing fibers used to form the containment case shown in FIG. 2.

In the exemplary embodiment, containment casing 40 includes a core 50 that is formed by a plurality of core layers 52 of reinforcing fibers bonded together by a thermoset resin 54. Each core layer 52 includes a plurality of braids of the reinforcing fibers. Referring also to FIG. 4, in one embodiment, the reinforcing fibers are braided into a braided mat 56 where the braids are aligned to extend in a circumferential direction. The braids are formed by braiding fiber tows 58 containing about 10,000 to about 30,000 fibers per tow. In alternate embodiments fiber tows 58 can contain less than 10,000 fibers or greater than 30,000 fibers. However, the strength of core 50 is reduced when the tows contain less than 10,000 fibers, and the weight of containment casing 40 increases when fiber tows 58 contain greater than 30,000 fibers.

Any suitable reinforcing fiber can be used to form core layers 52, including, but not limited to, glass fibers, graphite fibers, carbon fibers, ceramic fibers, aromatic polyamid fibers, for example poly(p-phenylenetherephtalamide) fibers (KEVLAR fibers), and mixtures thereof. Any suitable thermosetting polymeric resin can be used in forming core 50, for example, vinyl ester resin, polyester resins, acrylic resins, epoxy resins, polyurethane resins, and mixtures thereof.

Figure 5:
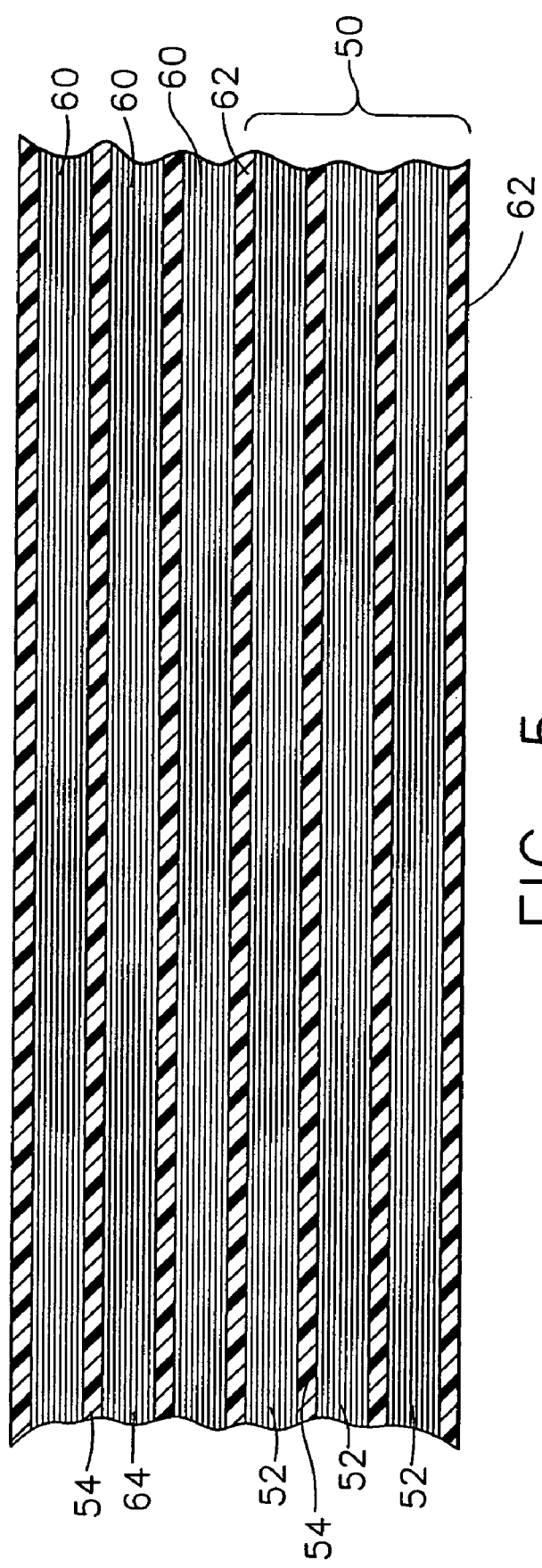
FIG. 5 is a schematic cross-section illustration of a portion of the fan containment case shown in FIG. 2 in accordance of another exemplary embodiment.

Fan containment casing 40 also includes a plurality of build-up layers 60 bonded to an inner surface 62 of core 50. Build-up layers 60 are formed from spiral wound braids 64 of reinforcing fibers bonded together by thermoset 54. The spiral winding pattern of the braids of reinforcing fibers reduces layer drop off during impact which in turn reduces stress concentration. During impact, the kinetic energy is dissipated by delamination of build-up layers 60 and core layers 52. The delaminated build-up layers 60 and core layers 52 capture and contain impact objects. In another embodiment, shown in FIG. 5, build-up layers 60 are bonded to an outer surface 68 of core 50. In still another embodiment, build-up layers 60 are bonded to both outer surface 68 and inner surface 62 of core 50.

Figure 6:
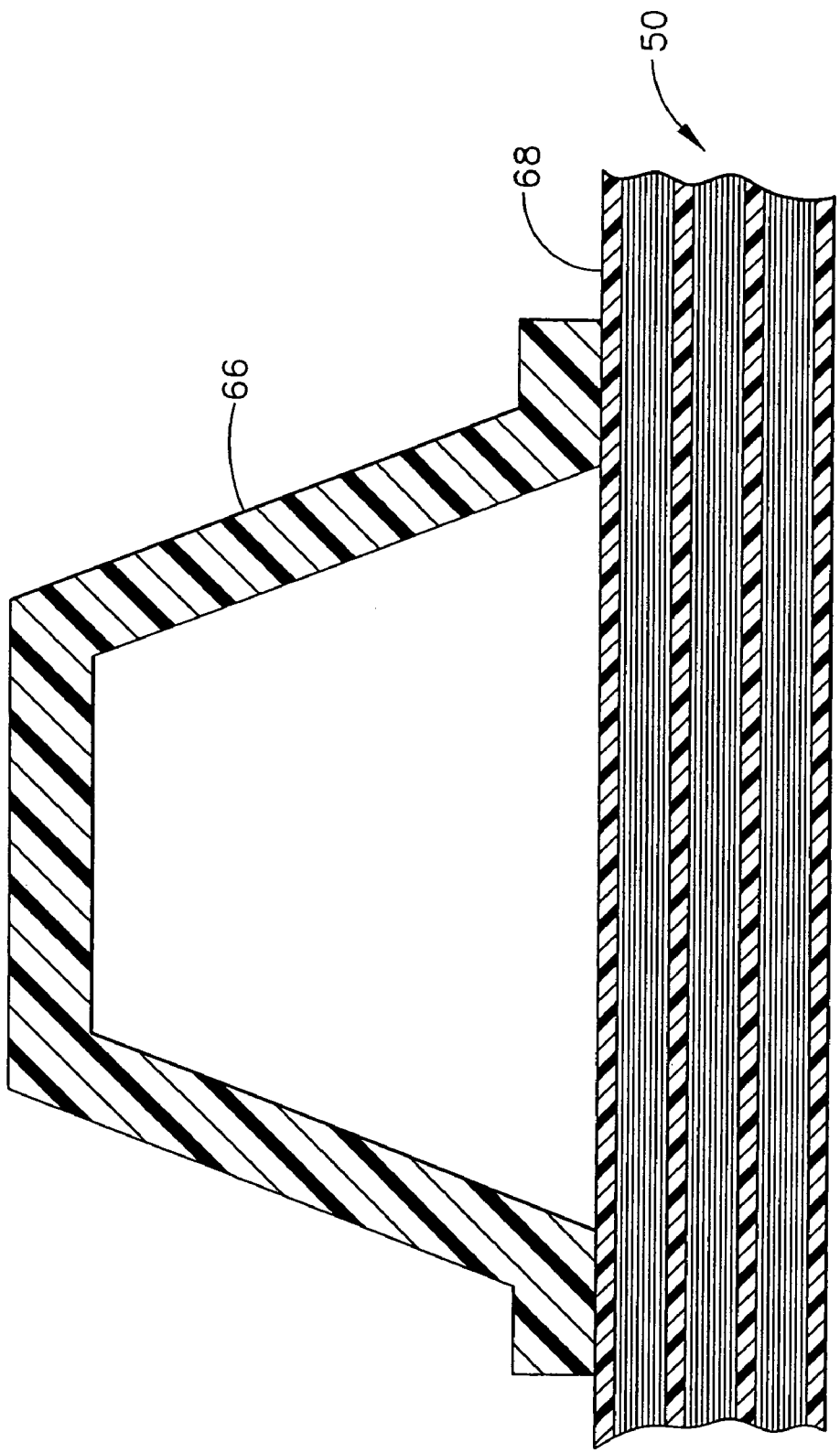
FIG. 6 is a schematic cross-section illustration of another embodiment of the fan containment case shown in FIG. 2.

Referring to FIG. 6, in another embodiment, fan containment casing 40 includes at least one stiffener 66 bonded to outer surface 68 of core 50. Stiffeners 66 have a substantially inverted U-shape and are designed to break away from containment case 40 during an impact event to relieve stress concentration in containment case 40. In an alternative embodiment, stiffeners 66 have an I-shape. Stiffeners 66 can be formed from any suitable material, for example, fiber reinforced plastic materials. To provide more structural stiffness, stiffener 66 is formed with a high height to width ratio, and is designed to separate from casing 40 during impact.

Fan containment casing 40 is fabricated, in the exemplary embodiment, by bonding together core layers 52 and build-up layers 60 together with thermosetting polymeric resin 54. Particularly, a mold is used to define the desired size and shape of containment casing 40. Build-up layers 60, core layers 52 and polymeric resin 64 are positioned in the mold. A vacuum is applied to the layered structure in the mold by any suitable method, for example vacuum bagging, and heat is applied to the structure to cure polymeric resin 54. Heat is applied to the layered structure by any suitable method, for example, by placing the layered structure in a heat chamber, oven or autoclave. The vacuum pulls polymeric resin into and impregnates fiber mats 56 to provide added strength to containment casing 40.

The above described composite fan containment casing 40 has exceptional impact resistance and damage tolerance properties and provides significant weight savings compared to known metallic containment casing designs. Containment casing facilitates containing a released blade or blade part within the containment casing in the event a blade is released from the engine during operation.

While the invention has been described in terms of various specific embodiments, those skilled in the art will recognize that the invention can be practiced with modification within the spirit and scope of the claims.

What is claimed is:

1. A composite fan casing for a gas turbine engine, said casing comprising:
    a core having a plurality of core layers of reinforcing fiber bonded together with a thermosetting polymeric resin, each said core layer comprising a plurality of braided reinforcing fibers, said braids of reinforcing fibers aligned in a circumferential direction; and
    at least one stiffener bonded to an outer surface of said core.

2. A composite fan casing in accordance with claim 1 wherein each said core layer comprises a mat of braided reinforcing fibers.

3. A composite fan casing in accordance with claim 1 further comprising at least one buildup layer bonded to at least one of an inner surface of said core and said outer surface of said core, each said build-up layer comprising a plurality of braided reinforcing fibers, said braided fibers wound in a spiral pattern and bonded together with said thermosetting resin.

4. A composite fan casing in accordance with claim 1 wherein said reinforcing fibers comprise at least one of carbon fibers, graphite fibers, glass fibers, ceramic fibers, and aromatic polyamid fibers.

5. A composite fan casing in accordance with claim 1 wherein said thermosetting polymeric resin comprises at least one of vinyl ester resins, polyester resins, acrylic resins, epoxy resins, and polyurethane resins.

6. A method of fabricating a composite fan casing for a gas turbine engine, said method comprises:
    forming a core having a plurality of core layers of reinforcing fiber bonded together with a thermosetting polymeric resin, each core layer comprising a plurality of braided reinforcing fibers formed from tows of fibers, the braids of reinforcing fibers aligned in a circumferential direction; and
    bonding at least one stiffener to an outer surface of the core.

7. A method in accordance with claim 6 wherein forming a core comprises forming a core having a plurality of core layers of braided reinforcing fiber mats bonded together with a thermosetting polymeric resin.

8. A method in accordance with claim 6 further comprising:
    forming at least one buildup layer comprising a plurality of braided reinforcing fibers, the braided fibers wound in a spiral pattern and bonded together with the thermosetting resin; and
    bonding the at least one build-up layer to at least one of an inner surface of the core and said outer surface of the core.

9. A method in accordance with claim 6 wherein the reinforcing fibers comprise at least one of carbon fibers, graphite fibers, glass fibers, ceramic fibers, and aromatic polyamid fibers.

10. A method in accordance with claim 6 wherein the thermosetting polymeric resin comprises at least one of vinyl ester resins, polyester resins, acrylic resins, epoxy resins, and polyurethane resins.

11. A method of fabricating a composite fan casing for a gas turbine engine, said method comprises:
- forming a core having a plurality of core layers of reinforcing fiber bonded together with a thermosetting polymeric resin, each core layer comprising a plurality of braided reinforcing fibers formed from tows of fibers, the braids of reinforcing fibers aligned in a circumferential direction;
- bonding at least one build-up layer to at least one of an inner surface of the core and an outer surface of the core; and
- bonding at least one stiffener to said outer surface of the core.

12. A method in accordance with claim 11 wherein forming a core comprises forming a core having a plurality of core layers of braided reinforcing fiber mats bonded together with a thermosetting polymeric resin.

13. A method in accordance with claim 11 wherein bonding at least one build-up layer comprises forming at least one buildup layer comprising a plurality of braided reinforcing fibers, the braided fibers wound in a spiral pattern and bonded together with the thermosetting resin.

14. A method in accordance with claim 11 wherein the reinforcing fibers comprise at least one of carbon fibers, graphite fibers, glass fibers, ceramic fibers, and aromatic polyamid fibers.

15. A method in accordance with claim 11 wherein the thermosetting polymeric resin comprises at least one of vinyl ester resins, polyester resins, acrylic resins, epoxy resins, and polyurethane resins.

* * * * *